(12) United States Patent
Pallonen

(10) Patent No.: US 6,408,169 B1
(45) Date of Patent: *Jun. 18, 2002

(54) METHOD AND SYSTEM FOR SELECTING AN ANTENNA BEAM OF A BASE STATION OF A RADIO SYSTEM

(75) Inventor: Jorma Pallonen, Helsinki (FI)

(73) Assignee: Nokia Telecommunications Oy, Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/194,172

(22) PCT Filed: May 21, 1997

(86) PCT No.: PCT/FI97/00307
§ 371 (c)(1),
(2), (4) Date: Nov. 20, 1998

(87) PCT Pub. No.: WO97/44978
PCT Pub. Date: Nov. 27, 1997

(30) Foreign Application Priority Data

May 22, 1996 (FI) .................................................. 962165

(51) Int. Cl.[7] .............................................. H04B 1/06
(52) U.S. Cl. .................... 455/277.2; 455/272; 455/134; 455/135
(58) Field of Search ............................... 455/13.3, 562, 455/279.1, 67.1, 134, 424, 561, 423, 277.1, 277.2, 140, 135; 342/368, 372, 374, 373

(56) References Cited

U.S. PATENT DOCUMENTS

| | | | | |
|---|---|---|---|---|
| 5,361,404 A | * | 11/1994 | Dent | 455/135 |
| 5,590,399 A | * | 12/1996 | Matsumoto et al. | 455/449 |
| 5,621,752 A | * | 4/1997 | Antonio et al. | 375/200 |
| 5,623,484 A | * | 4/1997 | Muszynski | 370/335 |
| 5,634,204 A | * | 5/1997 | Takahashi et al. | 455/134 |
| 5,684,491 A | * | 11/1997 | Newman et al. | 342/374 |
| 5,710,995 A | * | 1/1998 | Akaiwa et al. | 455/277.2 |
| 5,740,526 A | * | 4/1998 | Bonta et al. | 455/277.2 |
| 5,757,318 A | * | 5/1998 | Reudink | 342/374 |
| 5,818,385 A | * | 10/1998 | Bartholomew | 342/372 |
| 5,893,033 A | * | 4/1999 | Keskitalo et al. | 455/437 |
| 5,918,164 A | * | 6/1999 | Takahashi et al. | 455/134 |
| 5,966,094 A | * | 10/1999 | Ward et al. | 342/373 |
| 5,966,670 A | * | 10/1999 | Keskitalo et al. | 455/562 |

FOREIGN PATENT DOCUMENTS

| | | |
|---|---|---|
| EP | 352 787 | 1/1990 |
| EP | 431 956 | 6/1991 |
| EP | 647 981 | 4/1995 |
| EP | 741 466 | 11/1996 |
| WO | 95/33312 | 12/1995 |
| WO | 96/08850 | 3/1996 |

* cited by examiner

Primary Examiner—Dwayne Bost
Assistant Examiner—Sonny Trinh
(74) Attorney, Agent, or Firm—Pillsbury Winthrop LLP

(57) ABSTRACT

The present invention relates to a base station of a radio system whose antenna means (11) include: means (6 to 8) for receiving signals associated with the same logical channel by at least two antenna beams (1 to 4), measuring means (8) for measuring the signal level of the signals received by the antenna beams, and control means (8) for selecting one or more antenna beams (1 to 4) and for supplying the signals of the selected antenna beam to a receiver unit (5) of the base station (BTS1). In order that the best possible signal would be definitely transmitted to the base station, the base station (BTS1) comprises means for measuring the quality of the signals and for generating a quality signal (BER) and for supplying it to the control means (8), and the control means (8) are arranged to select an antenna beam (1 to 4) on the basis of the signal level measured by the measuring means and the quality signal (BER) supplied to the control means.

6 Claims, 2 Drawing Sheets

METHOD AND SYSTEM FOR SELECTING AN ANTENNA BEAM OF A BASE STATION OF A RADIO SYSTEM

This application is the national phase of international application PCT/FI97/00307 filed May 21, 1997 which designated the U.S.

FIELD OF THE INVENTION

The present invention relates to a method for selecting an antenna beam of a base station of a radio system from among two or more optional antenna beams. The antenna beams are arranged to receive signals associated with the same logical channel. The antenna means of the base station are provided with measuring means for measuring the signal level of a received signal. The signal level of the signals received by different antenna beams is measured and the antenna beam that has received the signals with the strongest signal strength is selected for use. The signals received by the selected antenna beam are supplied further to a receiver unit of the base station situated at a distance from the antenna means.

The invention also relates to a base station of a radio system whose antenna means include means for receiving signals associated with the same logical channel by at least two antenna beams, measuring means for measuring the signal level of the signals received by the antenna beams, and control means for selecting one or more antenna beams and for supplying the signals received by means of the selected antenna beam or antenna beams further to a receiver unit of the base station arranged at a distance from the antenna means.

The invention further relates to a cellular radio system including a base station comprising antenna means arranged at a distance from the base station for receiving radio signals associated with the same logical channel by at least two antenna beams, measuring means for measuring the signal level of the signals received by the antenna beams, and control means for selecting one or more antenna beams and for supplying the signals received by means of the selected antenna beam or antenna beams further to a receiver unit of the base station, and a network management center connected by means of a data transmission connection to the base station.

This invention especially relates to the size of the radio coverage area of base stations in a cellular radio system. It has proved to be very difficult to cover large, almost uninhabited areas by a cellular radio system as the need for traffic capacity in these areas is generally so low that increasing the coverage area. of the system by new base stations is an alternative that is too expensive. To cover a large area by a few base stations is often almost impossible because of path attenuation. Especially on higher frequencies, such as 1800 or 1900 MHz which has a significant, path attenuation.

DESCRIPTION OF RELATED ART

Most often the geographical area covered by the base station can be enlarged at least to some extent by increasing the transmission power of base station transmitters, but a problem will then be the insufficient transmission power of subscriber terminal equipment which in practice determines the largest possible size of the coverage area. That is, although the subscriber terminal equipment were able to receive signals sent by the base station on a higher power than normal, the base station is not able to receive signals sent by subscriber terminal equipment.

One known solution for improving the reception ability of base stations is that narrowing of antenna beams of base stations narrowed, whereby a geographical area of a specific size is no longer attempted to be covered by one wide beam antenna element, but several narrow beam receiving antenna elements are directed thereto. The division of the geographical area covered by the base station into narrower beams than before entails, however, that the number of beams and the available antenna elements will grow significantly, which in turn sets new requirements for the cabling of the base station, for example. As a base station is generally situated at a distance from antenna means, that is, in practice on a ground level next to an antenna mast, it is advantageous to the cabling of the base station that signals received by only one or two (diversity reception) antenna beams, for example, be directed to the base station because the number of cables needed between the antenna mast and the base station remains low.

A base station is previously known where an antenna mast is provided with a separate control unit, that is, a so-called RSSI receiver (Received Signal Strength Indication). The antenna mast comprises means for receiving signals with several narrow beam antenna beams, in which case the signals received by different antenna beams and associated with the same logical channel are directed to the inputs of the control unit. The control unit then measures the signal level of a signal received for each signal supplied thereto and selects the signal with the strongest signal strength to be supplied further to the receiver unit of the base station.

The most significant weakness of the prior art base station explained above is that because the control unit selects the signal to be supplied to the base, station. only on the basis of its signal strength, the control unit may under unfavorable conditions be locked into an incorrect signal. That is, if in the environment of the base station, there is some strong source of disturbance (e.g. a faulty radio link) whose frequency corresponds to the frequency channel used by a mobile station, for example, and whose signals are heard more strongerly at the base station than the signals of the mobile station, it may happen that the control unit transmits to the receiver unit of the base station a signal originating from the source of disturbance in place of the signal sent by the mobile station, in which case the connection between the base station and the mobile station will. break.

SUMMARY OF THE INVENTION

The object of the present invention is to solve the problem explained above and attain a method for selecting an antenna beam of a base station in such a manner that the best possible signal will be definitely transmitted to the base station, even under disturbed conditions. This object is achieved with the method of the invention that is characterized by monitoring the quality of the signals received by the receiver unit of the base station by means of said selected antenna beam, and selecting some other antenna beam for use in place of the first selected antenna beam if the quality of the signals received by the receiver unit falls below a predetermined reference level.

The invention also relates to a base station to which the method of the invention can be applied. The base station comprises means for measuring the quality of the signals received by the receiver unit from the antenna means and for generating a quality signal responsive to the quality of the signals and for supplying it to the control means. The control means are arranged to select one or more antenna beams on the basis of the signal level measured by the measuring means and the quality signal supplied to the control means.

The invention is based on the idea that the selection of the most suitable antenna beam will be significantly easier, and that the reception conditions of the base station are significantly improved especially in disturbed conditions when in addition to the strength of the received signal, the quality of the signal is taken into consideration in the selection of the antenna beam. As known base stations are already able to determine the quality of the signals received by their receiver units, this feature can be utilized according to the invention so that a signal describing the quality of the signal is directed from the base station to a control unit arranged in association with the antenna of the base station. In that case the control unit is able to pay attention both to the signal strength and signal quality in the selection of an antenna beam. As the information representing the quality of the received signal is conveyed to the control unit from the base station, the method of the invention can be employed without requiring complicated features that raise the price of the control unit. It is therefore necessary to add only a port to a control unit (RSSI receiver) known per se for receiving a signal representing quality and logic (a computer program) for selecting an antenna beam in accordance with the invention.

The invention further relates to a cellular radio system where the 10 method of invention and the base station of the invention can be employed. In the cellular radio system the base station comprises means for measuring the quality of the signals received by the receiver unit from the antenna means and for generating a quality signal responsive to the quality of the signals and for supplying it to the control means, in which case the control means are arranged to select one or more antenna beams on the basis of the signal level measured by the measuring means and the quality signal supplied to the control means. The base station further comprises means for sending information representing the signal level of the received signals and the quality of the signals received by the receiver unit separately for each antenna beam to the network management center by means of said data transmission connection, and that the network management center includes data processing means for processing data received from the base station to determine the disturbance level in the environment of the base station.

By means of values representing the strength and quality of the signals received by the base station, the operator may collect, for the network management center information about disturbances in the geographical area covered by the cellular radio system. That is, because the base station is able to identify a disturbed signal in such a manner that the strength of the signal is great but the quality of the signal falls below the predetermined level (as it is an incorrect signal), the base station is able to collect a significant amount of information that the operator can utilize for scanning disturbances. This information is for example the directions in which the source of disturbance is situated, the frequency of disturbance and the time when the disturbance occurred. By means of this information, the operator may try to trace the source of disturbance, especially if it is a regularly occurring disturbance.

The preferred embodiments of the method and the base station of the invention appear from the appended dependent claims.

BRIEF DESCRIPTION OF THE DRAWINGS

In the following, the invention will be explained in more detail with reference to the accompanying figures, where.

DETAILED DESCRIPTION

Figure 1:
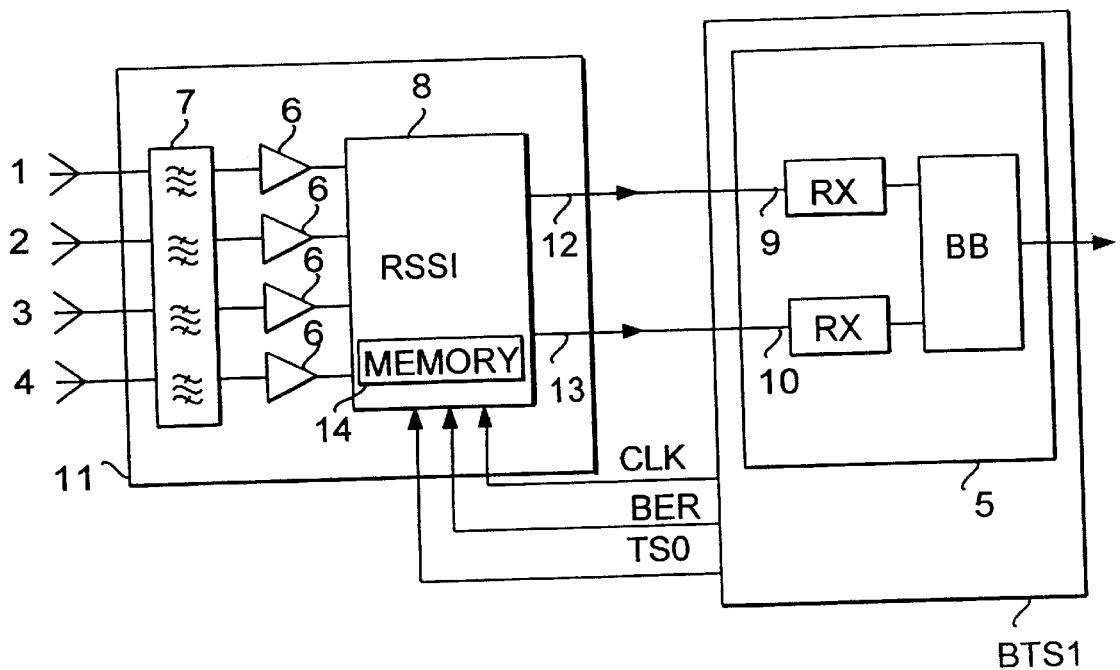
FIG. 1 shows a block diagram of a first preferred embodiment of the base station of the invention.

FIG. 1 shows a block diagram of a first preferred embodiment of the base station of the invention. The base station of FIG. 1 can be a base station of the GSM cellular radio system (Groupe Spécial Mobile), for example, comprising one receiver 5 for receiving signals received by means of antenna beams 1 to 4. The base station may also have other receivers which also receive signals transmitted by means of the antenna beams 1 to 4. In that case the base station preferably has branching elements (not shown in the figures) between amplifiers 6 and an RSSI receiver 8, in which case the received signals are branched by means of the branching elements to each receiver or to the RSSI receiver corresponding to it.

Amplifiers 6, filters 7 and the RSSI unit 8 in FIG. 1 are integrated into one assembly 11 which is arranged to be mounted to an antenna mast. If there is one antenna with several antenna elements, the unit 11 can be attached to the rear surface of the antenna, for example. Thus the cabling of the base station will be simpler because a separate cable to the receiver 5 is not needed for each antenna beam 1 to 4. It is sufficient that the received signals are conveyed from the antenna mast to the receiver unit 5 of the base station BTS1 with two antenna cables (or with one if the receiver does not utilize diversity reception).

The signals received by the antenna beams 1 to 4 of the base station are supplied via band-pass filters 7 and pre-amplifiers 6 to the RSSI receiver 8 (Received Signal Strength Indication). As can be seen in FIG. 1, the RSSI receiver comprises more inputs than outputs, that is, four inputs and two outputs 12 and 13. The number of the inputs and similarly the receiving antenna beams can be greater (or smaller) than four.

The RSSI receiver 8 comprises measuring means by means of which it selects two signals with the strongest signal strength to be supplied further via its outputs 12 and 13. A frame clock signal CLK is supplied to the RSSI receiver in order that the RSSI receiver would be able to operate separately for each time slot, that is, by means of this clock signal, the RSSI unit 8 decides to which time slot the received signal belongs. Therefore the RSSI receiver selects the two strongest signals in each time slot. Supplying the time slot clock CLK to the RSSI receiver 8 also makes it possible for the RSSI receiver to take samples between the time slots, that is, at a moment when there should be no traffic on the frequency channel in question. The signal strength measured at that moment represents disturbances caused by the environment.

A signal TSO indicating a null time slot is also supplied to the RSSI receiver 8. The RSSI receiver 8 requires this time slot to be indicated because in the GSM system, there is no continuous traffic in this time slot, but the mobile station uses it only to show that it has entered the network. As the RSSI receiver 8 has not necessarily selected for use the beam (or those beams) that will point towards the mobile station that has entered the network, the first access burst sent by the mobile station can remain undetected by the base station. The RSSI receiver 8 will, however, detect it. In order that the next burst would not be unnoticed by the base station, the RSSI receiver should, after this connect this, beam to the receiver unit of the base station for the duration of 50 time slots because the mobile station will resend an RACCH burst, after 2 to 50 time slots. This operation on the basis of one measuring result, as explained above, should be avoided on other time slots, but on the 0 time slot it is necessary. Therefore the 0 time slot should be indicated for the RSSI receiver so that it could select the correct beam direction algorithm.

In the RSSI receiver 8 there may be e.g. a 16-bit processor which attends to the beam selection and the physical measuring activity and its timing with the AD converter. In addition to this, the RSSI may also have another, a more powerful processor by means of which the RSSI receiver estimates the measuring results and information from the base station in order to have as much profit from them as possible.

The receiver 5 of the base station BTS1 carries out diversity reception in a manner known per se for signals supplied further via its inputs 9 and 10 to the baseband part BB by applying baseband maximum ratio combination, whereby an amplification of about 3 dB can be attained in reception because of signal combination. The receiver 5 monitors, in the manner known as such, the quality of the signals received by it by indicating a signal noise ratio S/N or by calculating a bit error ratio BER. In accordance with the invention, the base station BTS1 generates a quality signal BER, which is based on the quality of the signal observed by the receiver, the quality signal being based in the case of FIG. 1 on the bit error ratio of the signals received by the receiver 5. The base station BTS1 supplies the quality signal BER to the RSSI receiver, in which case the RSSI receiver is transmitted information on the quality of those signals it has selected to be forwarded.

For example, an RS-422 bus, known per se, can provide a connection between the RSSI receiver and the base station BTS1 by means of which the time slot clock CLK, the signal TSO indicating the 0 time slot and the quality signal BER are supplied from the base station to the RSSI receiver. Therefore by utilizing this connection, information can also be transferred from the RSSI receiver to the base station when required.

The quality signal BER supplied to the RSSI receiver 8 is continuously somewhat behind in time, that is, it represents the quality of such signals that the RSSI receiver has already forwarded to the receiver 5 of the base station BTS1. This means in such a time division system as the GSM system that the RSSI receiver makes, decisions associated with beam selection on the basis of old quality information of some time slots. This delay is not harmful as a subscriber of the system hardly even notices if a few time slots were left out of the ongoing connection because of an incorrect beam selection. To take the delay explained above into consideration, the RSSI receiver must, however, have a time-slot-specific memory 14 to which the information received by the quality signal BER can be stored until it is the turn of said time slot to receive again. Then the RSSI receiver measures the signal level of the signals received by different beams 1 to 4. After this, the RSSI receiver selects preliminarily for use the two beams with which the signals with the strongest signal level have been received. Next the RSSI receiver 8 retrieves from the memory 14 the quality information corresponding to this time slot. If the information in the memory 14 indicates that signals with a quality level falling below the predetermined quality level have been received by either of the preliminarily selected beams in the previous time slot or time slots, the RSSI receiver selects another beam in place of this beam, preferably a beam with which the signals with the next strongest signal level have been received.

Figure 2:
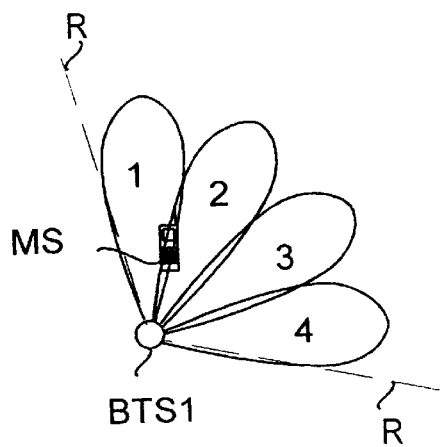
FIG. 2 illustrates the directing of the antenna beams of the base station of FIG. 1.

FIG. 2 illustrates the directing of the antenna beams 1 to 4 of the base station BTS1 in FIG. 1. FIG. 2 shows one of the base station sectors whose boundaries are illustrated with broken lines R and to which four antenna beams 1 to 4 are directed. These beams thus receive radio signals associated with the same logical channel, which signals are directed to the RSSI receiver of FIG. 1.

The mobile station MS shown in FIG. 2 is situated at a point where the beams 1 and 2 overlap. Therefore the base station BTS1 is able to carry out diversity reception by these beams. If then it should be found out that the quality of the signals received with the beam 2 falls below the predetermined quality level, the RSSI receiver can stop utilizing the beam 2 and replace it by the beam 3, for example, in which case the effect of disturbing signals originating from the direction of the beam 2 can be minimized.

Figure 3:
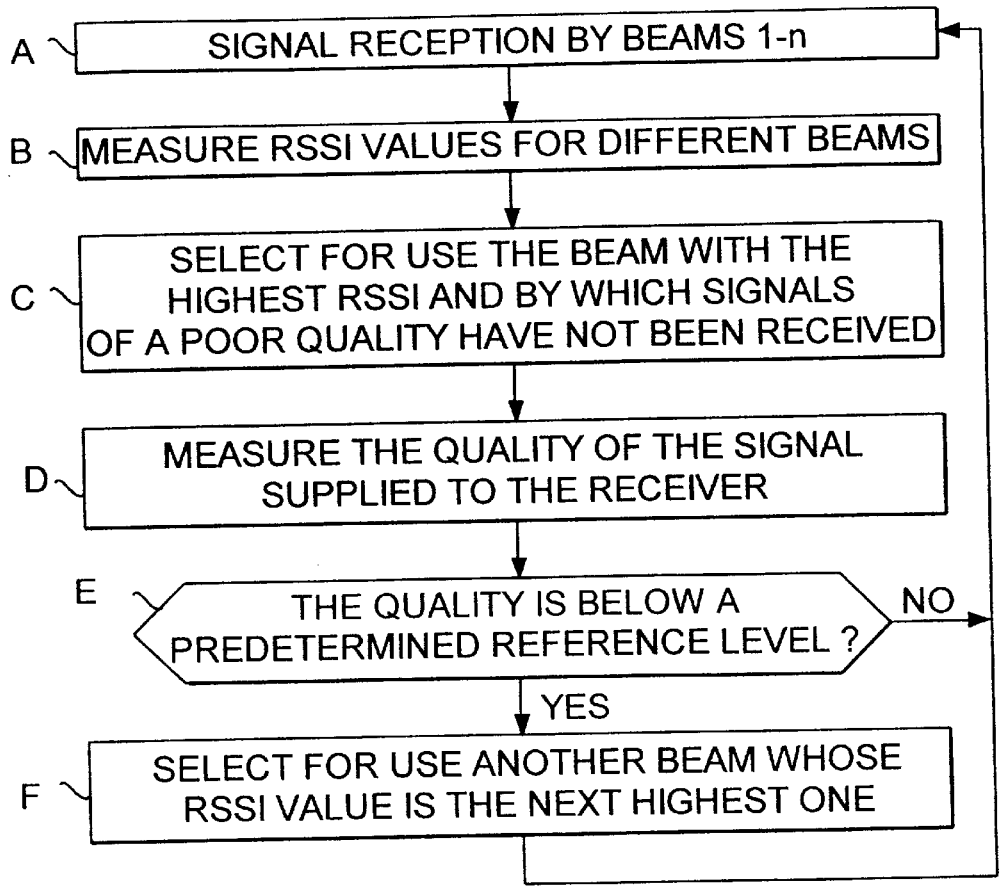
FIG. 3 shows a flow diagram of a first preferred embodiment of the method of the invention.

FIG. 3 shows a flow diagram of a first preferred embodiment of the method of the invention. The flow diagram of FIG. 3 can be applied to the selection of antenna beams of the base station of FIGS. 1 and 2, for example.

In block A the base station starts establishing a connection to a mobile station situated in its coverage area. In that case the RSSI receiver receives a burst from this mobile station by all antenna beams 1–n directed to the cell in question.

In block B the RSSI receiver measures the signal level of the received signal separately for the signals received by means of each beam.

In block C the RSSI receiver selects for use the beam by means of which the signals with the strongest signal level have been received. If it is a base station that applies diversity reception by two beams, as in the case of FIGS. 1 and 2, the RSSI receiver of course selects for use two beams instead of one.

In block D the base station measures the quality of the signal or signals supplied to its receiver, by calculating a bit error ratio for them, for example. After this, the base station generates a quality signal responsive to the quality of the signals, which quality signal it supplies to the RSSI unit. The RSSI unit stores into memory the information included in the quality signal until it is the turn of the time slot (logical channel) corresponding to this information to receive next.

In block E the RSSI unit receives a new burst from the same mobile station, in which case when selecting the beam, it checks from the memory if the signals received by the antenna beams selected in connection with the reception of the previous/preceding bursts of the same time slot were of a poor quality. If it should be found out then that one of the selected beams has then received signals of a poor quality, block F is entered. If, vice versa, the previously selected beams have received signals of a good quality, the RSSI receiver again selects for use the beams whose signal levels are the highest.

In block F the RSSI receiver selects for use the beam by means of which the signals with the next strongest signal level have been received. That is, an antenna beam via which poor quality signals have been received previously (e.g. within a time period of a certain length) is not selected, although the signals with the strongest signal level were received by means of it. In place of this beam that has selected poor quality signals, the RSSI receiver selects some other beam.

The beam selection illustrated in the flow diagram of FIG. 3 can of course vary somewhat case by case depending on the conditions. To make the beam selection more effective, it may be advantageous in some conditions that the RSSI receiver maintains in the memory a log of the best beams on each frequency and in each time slot, and sets the available beams into order on the basis of signal strength and quality. In this log the RSSI can also keep an account of the time and frequencies where disturbance was present. By utilizing this log, the RSSI receiver may try to select for use the first ranked beam, or if on the basis of information stored in the log, it is a regularly occurring disturbance (such as a faulty radio link), the RSSI receiver can select for use the one of the useful beams that comes from the greatest angle with respect to the disturbance.

To eliminate the effect of a temporarily occurring disturbance, the RSSI receiver should be given a limit after which the RSSI receiver will no longer to provide the receiver with a specific signal within a time period of a certain length, for example, if the quality of this signal is repeatedly found to be poor. Thus it is possible to avoid a situation where the RSSI receiver repeatedly tries to provide the receiver with a specific disturbance signal by means of different beams.

Figure 4:
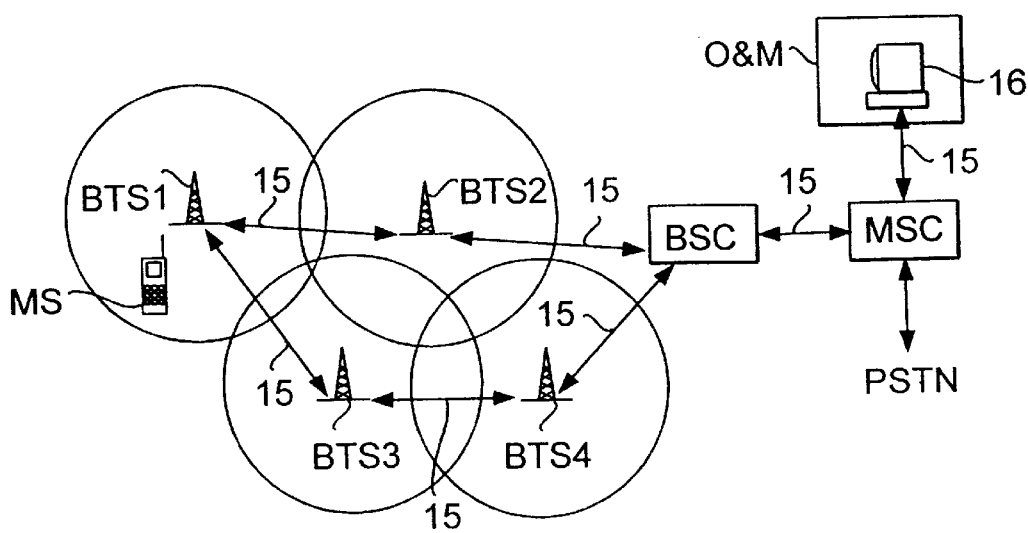
FIG. 4 illustrates a first preferred embodiment of the cellular radio system of the invention.

FIG. 4 illustrates a first preferred embodiment of the cellular radio system of the invention. The system of FIG. 4 may be a GSM system, for example.

FIG. 4 shows four base stations BTS1 to BTS4, each of which comprises means for establishing a connection to mobile stations in their radio coverage area. The base stations repeat signals of one another for example, so that the telecommunication signals received by the base station BTS1 from the mobile station MS are forwarded via the base station BTS2 to the base station controller BSC and further via the mobile services switching center MSC to a public switched telephone network. Data transmission connections between the base stations BTS1 to BTS4, the base station controller BSC, the mobile services switching center MSC and the network management center O&M can be formed of wired telecommunication connections, or alternatively, of radio links, for example.

In accordance with the invention, each base station BTS1 to BTS4 comprises means for transmitting information representing the signal level RSSI and quality BER of the received signal to the network management center O&M. Each base station preferably transmits this information at least for the beams that its RSSI receiver has selected for use. To reduce the amount of information to be transmitted, the base station may alternatively send this information to the network management center O&M only when one of the base station receivers has received signals with a strong signal strength whose quality falls below a predetermined quality criterion.

The network management center O&M comprises data processing means 16 for processing data received from different base stations. Hence the operator can monitor from the network management center O&M the disturbances occurring in different parts of the network and even try to locate the source of disturbance by means of this information. That is, if, for example, a specific base station repeatedly transmits information of disturbing signals which continuously disturb the same frequency channel and the same antenna beam, the operator may detect this by compiling statistics of this information transmitted to the network management center and try to locate the source of disturbance. To make this possible, the information transmitted from the base station should include information at least about:

a frequency channel on which a disturbance occurred,
the identifier of an antenna beam with which disturbances were received, and
a time when a disturbance occurred.

By means of the information received by the data processing means 16, the operator can thus try to find out if one of the cells is continuously disturbed, if the disturbance is internal or external to the network, and from which direction the disturbance is coming.

It is to be understood that the foregoing explanation and the figures relating thereto are only intended to illustrate the present invention. Different variations and modifications of the invention will be obvious to those skilled in the art without deviating from the spirit and scope of the invention disclosed in the appended claims.

What is claimed is:

1. A base station of a radio system wherein frequency channels of the radio system are divided by a TDMA principle into logical channels, the base station including an antenna arrangement comprising:

a receiving arrangement to receive signals associated with a same logical channel via at least two antenna beams;

a measuring arrangement to measure a signal level of the signals received by the antenna beams; and a controlling unit to select at least one of the antenna beams and to supply the signals received via the at least one of the antenna beams to a receiver unit of the base station arranged at a distance from the antenna arrangement; and the base station comprises a clock generating arrangement to generate a clock signal indicating a change of time slots and to supply the clock signal to the controlling unit, and a quality measuring arrangement to measure a quality of the signals received by the receiver unit from the antenna arrangement and to generate a quality signal responsive to a quality of the signals and to supply the quality signal to the controlling unit, the antenna arrangement comprises means for receiving said quality signal from the base station and the controlling unit includes a memory to store information included in the quality signal separately for each of the time slots, the controlling unit being responsive to the clock signal for retrieving the information stored into the memory for a specific time slot and for utilizing the retrieved information in the selection of the at least one of the antenna beams when the clock signal indicates a time for a new time slot to receive, wherein another antenna beam is selected for use if the quality signal received from the base station indicates that the quality of the signals are below a predetermined reference level.

2. A base station according to claim 1, wherein the controlling unit is arranged to be mounted to an antenna mast of the base station in an immediate vicinity of at least one antenna element.

3. A base station according to claim 1, wherein controlling unit is arranged to select the at least one of the antenna beams having received the signals with strongest signal strength when the quality signal indicates that the received signals are of a good quality, and the controlling unit is arranged to select for use an antenna beam having received the signals with a next strongest signal strength when the quality signal indicates that the signals received by the selected at least one of the antenna beams are of a poor quality.

4. A base station according to claim 1, wherein the quality signal is responsive to at least one of a signal noise ratio, a bit error ratio and a quality class measured by the base station.

5. A base station according to claim 1, wherein:

the controlling unit includes data processing arrangement to maintain a log for each of the antenna beams at least of frequency channels and a time when, with a specified antenna beam, the signal level measured by the measuring arrangement exceeds a specified limit and the quality signal supplied to the controlling unit indicates that the received signals fall below a specified quality level, in addition to the signal level measured by the measuring arrangement and the supplied quality signal, the controlling unit is arranged to take into account information recorded in the log in the selection of said at least one of the antenna beams in such a manner that the controlling unit selects an antenna beam having a quality level exceeding a specified reference level based on statistics at a moment in question and on a frequency channel in question.

6. A cellular radio system comprising:

an antenna arrangement; and a base station arranged to receive information from an antenna arrangement arranged at a distance from the base station, the antenna arrangement being arranged to receive radio signals associated with a same logical channel by at least two antenna beams;

the antenna arrangement comprising:

a measuring arrangement to measure a signal level of the signals received by the antenna beams, and a controlling unit to select at least one of the antenna beams and to supply the signals received by the at least one of the selected antenna beams to a receiver unit of the base station;

the base station comprising:

a quality measuring arrangement to measure a quality of the signals received by the receiver unit from the antenna arrangement, to generate a quality signal responsive to the quality of the signals, and to supply the quality signal to the controlling unit, the controlling unit being arranged to select another antenna beam for use if the quality signal received from the base station indicates that the quality of the signals are below a predetermined reference level, a sending arrangement to send information representing the signal level of the received signals and the quality of the signals received by the receiver unit separately for each of the antenna beams to a network management center by using a data transmission connection; and the network management center comprises a data processing arrangement to process data received from the base station to determine a disturbance level in an environment of the base station.

* * * * *